United States Patent
Wainscott, Jr. et al.

(10) Patent No.: US 8,190,728 B1
(45) Date of Patent: *May 29, 2012

(54) BUILDING AUTOMATION SYSTEM DEVICES

(75) Inventors: Barrett G. Wainscott, Jr., Waukesha, WI (US); Anne M. Kumor, Greendale, WI (US); David E. Rasmussen, Dousman, WI (US)

(73) Assignee: Johnson Controls Technology Company, Holland, MI (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/538,785

(22) Filed: Aug. 10, 2009

Related U.S. Application Data

(63) Continuation of application No. 10/439,394, filed on May 16, 2003, now Pat. No. 7,634,555.

(51) Int. Cl.
*G06F 15/173* (2006.01)
(52) U.S. Cl. ........... 709/223; 709/203; 709/217; 700/19
(58) Field of Classification Search .................. 709/203, 709/223, 224, 200, 217; 700/19, 20, 258
See application file for complete search history.

(56) References Cited

U.S. PATENT DOCUMENTS

| | | | |
|---|---|---|---|
| 4,872,397 A | 10/1989 | Demeter et al. | |
| 5,061,916 A | 10/1991 | French et al. | |
| 5,117,900 A | 6/1992 | Cox | |
| 6,157,943 A * | 12/2000 | Meyer | 709/203 |
| 6,167,316 A | 12/2000 | Gloudeman et al. | |
| 6,366,832 B2 | 4/2002 | Lomonaco et al. | |
| 6,405,103 B1 | 6/2002 | Ryan et al. | |
| 6,487,457 B1 * | 11/2002 | Hull et al. | 700/17 |
| 6,687,698 B1 | 2/2004 | Nixon et al. | |
| 6,788,980 B1 | 9/2004 | Johnson | |
| 6,832,120 B1 * | 12/2004 | Frank et al. | 700/65 |
| 6,842,776 B1 | 1/2005 | Poisner | |
| 6,845,396 B1 | 1/2005 | Kanojia et al. | |
| 7,159,007 B2 | 1/2007 | Stawikowski | |
| 7,165,087 B1 | 1/2007 | Graupner et al. | |
| 7,254,607 B2 | 8/2007 | Hubbard et al. | |
| 7,634,555 B1 * | 12/2009 | Wainscott et al. | 709/223 |
| 2003/0023712 A1 | 1/2003 | Zhao et al. | |

(Continued)

OTHER PUBLICATIONS

OPC™ Foundation, "OPC XML-DA Specification," Version 1.0, Jul. 12, 2003, 100 pages.

*Primary Examiner* — Moustafa M Meky
*Assistant Examiner* — El Hadji Sall
(74) *Attorney, Agent, or Firm* — Foley & Lardner LLP

(57) ABSTRACT

A building automation control system for use in a building having an IT network includes at least one BAS controller connected to the IT network and at least one BAS device located within the building and connected to the at least one BAS controller through the IT network. Further the system may be configured to use standards-based IT technologies over the IT network to manage the at least one BAS device. The standards-based IT technologies may include DHCP to obtain IP addresses and network parameters of the BAS devices, DNS to provide a mechanism for associating the BAS devices with human-friendly names, a distributed mechanism for storing the names, and a method for locating the BAS devices by resolving names and IP addresses, SNTP to synchronize time on the BAS devices, SNMP to monitor the BAS devices and report alarms, SMTP for delivery of e-mail alarms, web-services to provide Internet-friendly communications, and standards-based IT security mechanisms to protect software of the BAS devices.

14 Claims, 3 Drawing Sheets

U.S. PATENT DOCUMENTS

| | | |
|---|---|---|
| 2003/0028577 A1 | 2/2003 | Dorland et al. |
| 2003/0033376 A1 | 2/2003 | Brownhill et al. |
| 2003/0061380 A1* | 3/2003 | Saito et al. .................... 709/238 |
| 2004/0030739 A1 | 2/2004 | Yousefi'zadeh |
| 2004/0218591 A1* | 11/2004 | Ogawa et al. ................. 370/364 |
| 2005/0198255 A1 | 9/2005 | Wainscott et al. |

* cited by examiner

BUILDING AUTOMATION SYSTEM DEVICES

CROSS-REFERENCE TO RELATED PATENT APPLICATIONS

This is a continuation of application Ser. No. 10/439,394, filed May 16, 2003, which is incorporated herein by reference in its entirety.

FIELD OF THE INVENTION

The present invention relates to building automation systems that utilize distributed network architectures. More specifically, the present invention relates to building automation systems for controlling subsystems of customers' buildings or other facilities using existing or standardized IT networks rather than dedicated or specialized BAS networks.

BACKGROUND OF THE INVENTION

It is generally known to provide building automation systems (BAS) having distributed network architectures. Such known systems are typically used to monitor and control operational subsystems found in commercial buildings and other facilities such as heating, ventilation and air conditioning (HVAC), fire, security, power management, parking structure management, elevator control, energy management, and the like.

As new requirements have arisen, new markets have opened up, and new technologies have become available, it has become necessary to expand the functionality and scope of such systems to satisfy customer demand and to remain cost competitive. For example, current BAS architectures have recently been designed to ensure they can co-exist with IT technology on a common IT network.

Although current BAS systems are capable of co-existing with existing standardized IT networks, such known systems have not heretofore been designed to fully utilize the capabilities of IT infrastructures. For example, the heretofore known BAS systems do not incorporate or use many standardized IT technologies that are now in common use on IT networks such as Dynamic Host Configuration Protocol (DHCP), Domain Name Server (DNS) protocol, Simple Network Time Protocol (SNTP), Simple Network Management Protocol (SNMP), Simple Mail Transfer Protocol (SMTP), web services, standards-based IT security mechanisms, and the like.

Accordingly, it would be advantageous to provide building automation systems that not only co-exist with IT systems, but are capable of directly interacting with and fully utilizing the standardized features and capabilities of such networks. In particular, it would be advantageous to provide BAS controllers and related devices that are capable of using standards-based technologies of existing IT networks such as DHCP, DNS, SNTP, SNMP, SMTP, web services, standards-based IT security mechanisms, and the like. Inexpensive, reliable, and widely adaptable IT compatible BAS systems that provide the above-referenced and other standardized IT functionality would represent a significant advance in the art.

SUMMARY OF THE INVENTION

The present invention relates to distributed network BAS systems that fully incorporate and utilize standards-based IT technologies such as DHCP and DNS to resolve network addresses and names, SNTP to synchronize time on the BAS controllers, SNMP to allow network monitoring of BAS devices and to report alarms, SMTP for delivery of E-mail alarms, web services to provide Internet-friendly communications, and use of standards-based IT security mechanisms to protect BAS software.

How these and other advantages and features of the present invention are accomplished (individually, collectively, or in various subcombinations) will be described in the following detailed description of the preferred and other exemplary embodiments, taken in conjunction with the FIGURES. Generally, however, they are accomplished in a building automation control system for use in a building having an IT network, including at least one BAS controller connected to the IT network and at least one BAS device located within the building and connected to the at least one BAS controller through the IT network. Further, the system may be configured to use standards-based IT technologies over the IT network to manage the at least one BAS device.

Another embodiment of the present invention provides a method of controlling BAS devices in at least one building using standards-based IT technologies to monitor statistics and manage operational parameters of the BAS devices on an enterprise intranet-type network. The method may include providing network and device management including one or more of the following functions: (a) discovery of the BAS devices on the network; (b) identification of the BAS device models and revisions; (c) tracking of online/offline status of the BAS devices; (d) tracking communication statistics including determining a number of data packets sent to or from the BAS devices, and determining a number of error transmissions; and (e) managing configuration parameters of the BAS devices including resolving IP addresses for the BAS devices, determining manufacturer information of the BAS devices, determining versions of operating systems, and setting protocol configuration parameters.

Another embodiment of the present invention provides a method of controlling BAS devices of at least one building using standards-based IT technologies on an enterprise intranet-type network. The method may include one or more of the following: (a) using DHCP to obtain IP addresses and network parameters; (b) using DNS to provide a mechanism for identifying hosts with human-friendly names, a distributed mechanism for storing the names, and a method for locating hosts by resolving names and IP addresses; (c) using SNTP to synchronize time on the BAS devices; (d) using SNMP to monitor the BAS devices and report alarms; (e) using SMTP for delivery of e-mail alarms; (f) using web-services to provide Internet-friendly communications; and (g) using standards-based security mechanisms to protect software of the BAS devices.

Another embodiment of the present invention provides a method of integrating BAS controllers and devices into an existing IT network of a building so that the BAS controllers and devices function as part of the existing IT network rather than as part of a parallel and separate network. The method may include configuring the BAS controllers to use standards-based IT technologies to provide network and device management of the BAS devices.

Another embodiment of the present invention provides an IT network that uses standards-based IT technologies to manage BAS devices within at least one building. The standards-based IT technologies may include one or more of the following: (a) DHCP to obtain IP addresses and network parameters of the BAS devices; (b) DNS to provide a mechanism for associating the BAS devices with human-friendly names, a distributed mechanism for storing the names, and a method for locating the BAS devices by resolving names and IP addresses; (c) SNTP to synchronize time on the BAS devices; (d) SNMP to monitor the BAS devices and report alarms; (e) SMTP for delivery of e-mail alarms; (f) web-services to provide Internet-friendly communications; and (g) standards-based IT security mechanisms to protect software of the BAS devices.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

Figure 1:
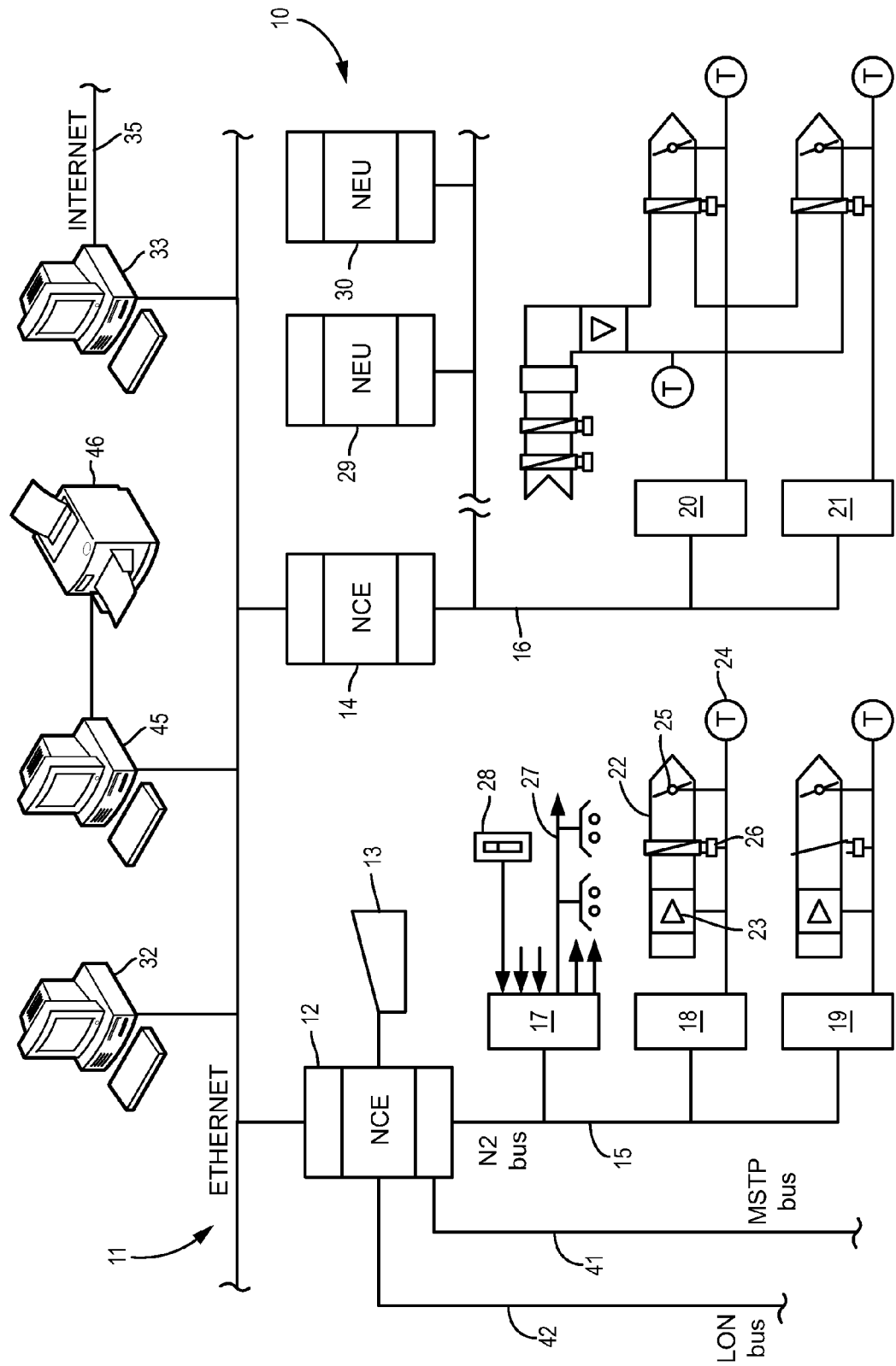
FIG. 1 is a block diagram of a building automation system for controlling subsystems of customers' buildings or other facilities using existing or standardized IT networks according to an exemplary embodiment.

Before explaining a number of preferred, exemplary, and alternative embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Before proceeding to the detailed description of the preferred and exemplary embodiments, several comments can be made about the general applicability and the scope thereof. First, while the components of the disclosed embodiments will be illustrated as being designed for a building automation control system for use in a building having an IT network, the features of the disclosed embodiments have a much wider applicability. For instance, the design is adaptable for other structures that employ control systems and IT networks. In addition, although specific examples of standardized IT technologies are described in this disclosure, any number of other standardized IT technologies may be used.

FIG. 1 illustrates an example of a building automation system (BAS) 10, such as one implemented using a Metasys® control system manufactured by Johnson Controls, Inc. of Milwaukee, Wis., U.S.A. BAS 10 may control environmental systems such as HVAC and lighting within a building. Building security and fire detection systems also can be interfaced with system 10.

According to the illustrated embodiment, a plurality of network control engines (NCEs) 12 and 14 operate separate groups of control subsystems of BAS 10 and are connected to a high speed digital communication network 11, such as a 10 Base-T or 100 Base-T Ethernet. As explained further below, NCEs 12 and 14 execute specialized programs to maintain the environmental conditions governed by their respective subsystems according to programmed parameters. An optional local input/output (I/O) panel 13 allows a user to monitor and control the functions of NCE 12 via a standard IT interface such as RS-232. NCEs 12 and 14 also perform numerous background tasks to assure that each of the nodes of network 11 is operating with the same set of global variables, is time synchronized, and has consistent directories of system names and configuration data.

The environmental subsystems in turn are governed by separate configurable field controllers (CFCs) 17, 18, 19, 20 and 21 which are connected to one of NCEs 12 and 14 by a field bus. As shown in FIG. 1, CFCs 17-21 may be connected to NCEs 12 and 14 by N2 buses 15 and 16, respectively. However, controllers 17-21 could instead (or additionally) be connected to NCEs 12 and 14 by alternative network architectures such as LON bus 42 or MSTP (high speed) bus 41. According to a preferred embodiment, NCE 12 is a high capacity controller capable of being connected to as many as three or more field buses simultaneously, while NCE 14 can be connected to one or two field buses simultaneously.

As illustrated in FIG. 1, CFCs 17-21 interface with BAS devices such as sensors, actuators and other devices of the respective BAS subsystems. Depending upon the type of BAS subsystem being controlled, CFCs 17-21 may receive signals from pressure/electric transducers, binary input contacts, differential pressure inputs and binary frequency inputs. Typical actuators and outputs of a subsystem include analog devices, solenoids, relays, motor controllers, indicator lights and annunciators. These BAS devices could be used in a wide variety of BAS subsystems, including but not limited to HVAC, fire, security, power management, parking structure, elevator control, energy management subsystems, etc. Similarly, the BAS devices could be used with a wide variety of BAS equipment such as doors, lights, fire detectors, sump detectors, chillers, boilers, vents, fans, etc.

In the exemplary system 10, a first CFC 17 operates lighting within an area of the building. A plurality of light circuits 27 are connected to relay outputs of CFC 17, which also receives input signals from manual room light switches 28. The second CFC 18 operates a conventional variable air volume (VAV) unit 22 of the building HVAC system and receives input signals from an airflow sensor 23 and a thermostat 24 within the room supplied by the VAV unit. In response to these input signals and control commands from the N2 bus, second CFC 18 operates electrical actuators of a variable damper 25 and a chiller coil valve 26.

In the illustrated embodiment, the second NCE 14 is provided with expanded capacity and range via its connection to two remote network expansion units 29 and 30 on the field bus. This eliminates the necessity of wiring the AC line voltage for separate devices back to NCE 14.

In addition to the NCEs, system 10 includes other Ethernet devices such as devices 32, 33 and 45. Devices 32, 34 and 45 may comprise additional NCEs, web servers, application servers, configuration servers, and the like. In the illustrated embodiment, Ethernet device 32 comprises a first user interface, such as a personal computer, which is connected to network 11 to communicate with NCEs 12 and 14. The first user interface 32 may be loaded with and execute a supervisory control program which gathers status data regarding the operation of components of system 10 and responds to user inputs by issuing commands that govern system operation. First user interface 32 may also store information regarding the configuration of system 10 and operational data associated with each level of the system organization.

Ethernet device 33 is a second user interface that is connected not only to network 11 but also to the Internet 35 for external communication. For example, the second user interface 33 may be loaded with software that implements a facility management system Website on the Internet 35. Alternatively, an external connection can be provided to an Intranet for an educational institution or a large business entity, thus enabling centralized control of several buildings on a campus. In either case, second user interface 33 may be loaded with a conventional Web server program for exchanging information over the Internet 35 (or Intranet) and/or over the network 11 via the standard Transport Control Protocol/Internet Protocol (TCP/IP).

Ethernet device 45 is yet another user interface connected to network 11 that may be used to provide non-BAS related functions such as secretarial support. As persons skilled in the art will appreciate, user interface 45 may be connected to additional devices 46 (e.g., other workstations, printers, scanners, fax machines, etc.) via network 11 or, alternatively, via communication ports (e.g., serial, parallel or USB ports), to provide user interface 45 as is well known in the IT field. User interfaces 32, 33, 45 are each preferably configured to run a standard IT operating system, such as Windows® NT. Thus, user interfaces 32, 33, 45 may exist and operate on the same Ethernet network 11 as NCEs 12 and 14. As described further below, each user interface 32, 33 and 45 preferably includes a web browser that allows BAS data to be accessed and displayed when a user with appropriate access rights makes such a request.

Figure 2:
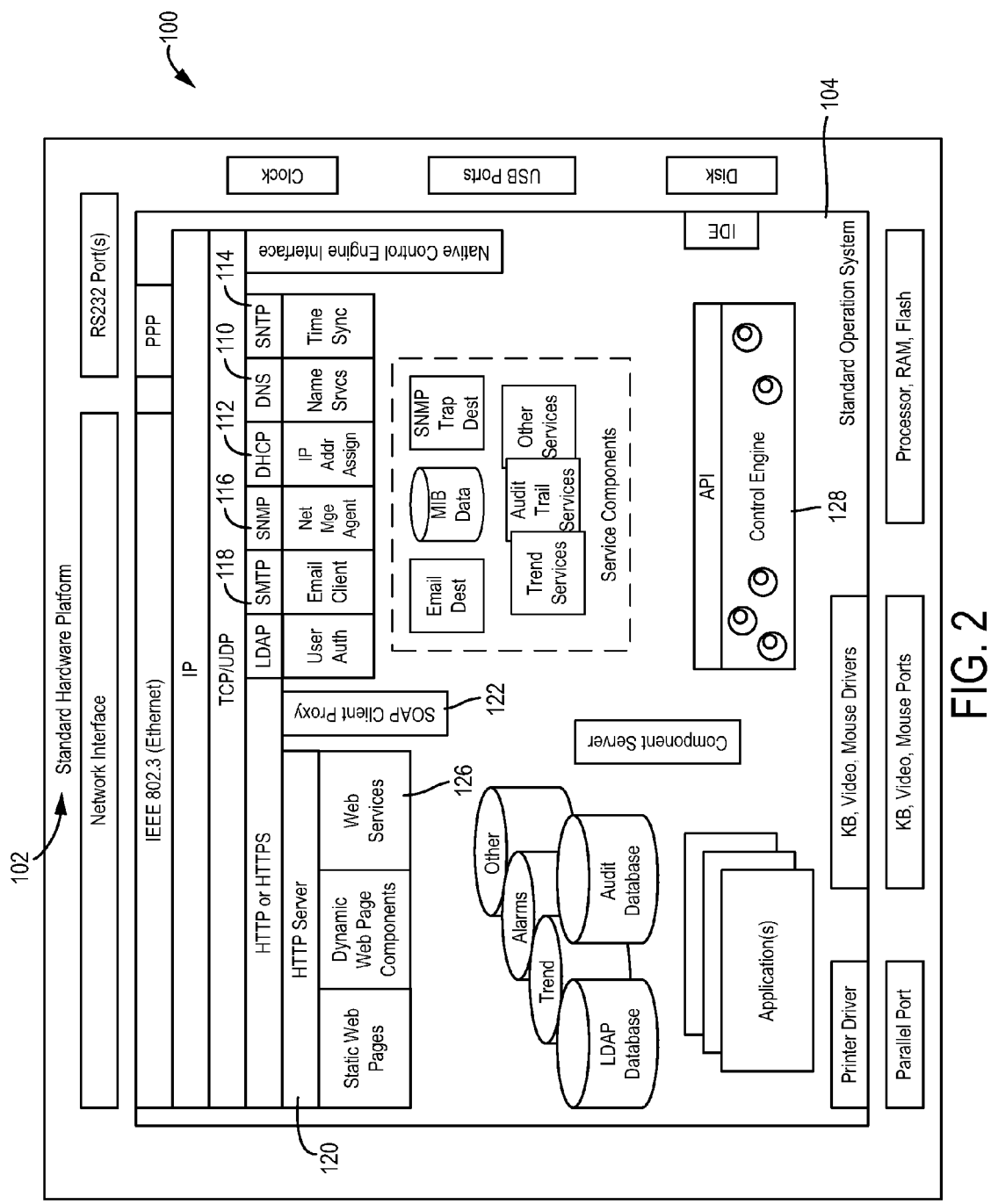
FIG. 2 is a block diagram of an Ethernet-based device architecture according to an exemplary embodiment.

Referring to FIG. 2, an exemplary Ethernet-based device architecture 100 for NCEs 12 and/or 14 is shown. BAS device architecture 100 includes many of the common components of a standard IT device architecture such as may be used in user interfaces 32, 33 and 45. For example, device architecture 100 may include a standard hardware platform 102 and a standard operating system 104 (e.g., Microsoft Windows® XP Embedded, XP, CE, 9X, ME, NT and 2000). Many of the features of device architecture 100 shown in FIG. 2 will now be discussed in greater detail.

As shown in FIG. 2, BAS device architecture 100 preferably includes a DNS element 110. As is generally understood in the art, a Domain Name Service (DNS) is a hierarchical system for identifying hosts on the Internet or on a private intranet. It provides a mechanism for identifying hosts with human-friendly names (as opposed to numeric IP addresses), a distributed mechanism for storing the name-IP pairs, and a method for locating hosts by resolving their names to IP addresses. It is a standard embraced by the Internet community for mapping names to IP addresses.

According to an embodiment of the present invention, DNS 110 may be utilized for naming conventions for host device names as well as the hierarchical domain structure defined by the DNS standards. DNS 110 may be integrated with the DNS naming conventions established by different users, where each user may have their own internal naming hierarchy. However, other standard IT host name-to-IP resolution mechanisms (such as WINS or a local hosts file) may be used in addition to DNS 110 or in place of DNS 110.

In addition to the use of DNS 110 or a similar IT-based service, BAS device architecture 100 may include a Dynamic Host Configuration Protocol (DHCP) element 112 that is capable of automatically obtaining an IP address and other related network parameters from a suitable DHCP server. For example, the BAS device having DHCP element 112 can make a request to the DHCP server for an IP address whenever needed (e.g., when the device is first installed or after a system reset). This avoids the need for static IP address assignment for BAS devices as was required in the past.

Many functions of Ethernet-based BAS devices, such as time-based data collection, scheduling of controller functions, and time-stamped alarms and events, require accurate knowledge of the time of day. For these functions to work correctly on a network and in order to recover the correct sequence of recorded events in a distributed environment, the time must be accurately synchronized across all controllers. According to an exemplary embodiment of the present invention, BAS architecture 100 includes a Simple Network Time Protocol (SNTP) element 114 to synchronize time to a known accurate source.

There are two primary roles that a device may perform for synchronizing time on the network:

Time Server—provides the current time to SNTP clients; and

SNTP Client—sends time requests to the SNTP server.

Under SNTP 114, the SNTP client is responsible for obtaining the correct time from the SNTP server using SNTP element 114. The SNTP server acts as the authoritative source of time on the network and may be located internally or externally, including on the Internet (e.g., a NIST atomic clock site). In order to minimize traffic outside the intranet, BAS 10 preferably includes a local server that acts as the authoritative time source to the other BAS devices on network 11 and that synchronizes with an external time source on a regular basis. As persons skilled in the art will understand, SNTP is an adaptation of Network Time Protocol (NTP) and is used to synchronize computer clocks on the Internet. Once the SNTP client obtains the correct synchronized time from the time server, it sets its own local clock to that time value. For the purposes of architecture 100, the term "time" may include (but is not limited to):

current absolute time of day to one second accuracy; and current date.

Each BAS device adjusts time for its local time zone via a UTC (coordinated universal time) offset. Moreover, each BAS device adjusts time for local daylight savings time as appropriate.

Network and device management encompasses a set of functionality that monitors statistics and manages operational parameters of BAS devices on a network. It includes the automatic discovery of BAS devices on the network, identification of device models and revisions, and tracking of the online/offline status of the device. Management also includes tracking of other data such as communication statistics, including the number of data packets sent to or from the BAS device, the number of error transmissions, and so on. It also includes functions to get and set configuration parameters within the BAS devices that control how the device operates. Examples include the IP address of the BAS device, device manufacturer information, version of the operating system, and protocol configuration parameters.

Still referring to FIG. 2, BAS device architecture preferably includes a Network Management Protocol (SNMP) element 116. SNMP element 116 is an application layer protocol used for exchanging BAS device and network management information with other BAS devices on the TCP/IP network 11. Although SNMP is used as a standard by most IT organizations to collect statistical information on typical network devices such as switches, routers, servers, workstations, and printers, it has not heretofore been used in connection with networked BAS devices such as described above. Similarly, SNMP 116 can also be used to send "traps" to networked BAS devices, indicating that an event or problem has occurred within the system 10.

SNMP 116 may include an SNMP agent. The SNMP agent is a component within the BAS device that is responsible for communicating to a network manager device via SNMP 116. The network manager device is responsible for collecting network and device management and statistics information from BAS devices on part of, or the entire, network. Network managers typically utilize high-end software packages to oversee the network. The SNMP network manager communicates to the SNMP agent via "get" services within SNMP 116, allowing the network manager to obtain operational statistics. The agent is responsible for managing the data locally within the device—either storing the data itself or obtaining it from other components within the device as needed. The network manager may also use SNMP 116 to send "set" requests to the agent, allowing it to configure parameters within the device.

In addition to getting and setting information in the BAS device, SNMP 116 can be used to send unsolicited "traps" from the BAS device to the network management station. A trap is an indication that some event has occurred in the system. As an example, a BAS device may have exceeded some reporting threshold, such as the number of bad packets it has received. For example, the trap facility may be used to communicate BAS system alarms to the network management station as an optional alarm/event destination. A configured SNMP destination component is sent certain alarms/events from other alarm components in the device. The SNMP destination formats the alarm as an SNMP trap and makes use of the SNMP agent services to send the alarm/event trap to the network manager.

BAS device architecture 100 also may include a Simple Mail Transfer Protocol (SMTP) element 118. SMTP element 118 may be utilized to send email messages over network 11 or the Internet 35. For example, the email alarm destination component in the associated BAS device can receive an alarm, reformat it for email, and utilize the services of SMTP element 118 to send the email to the appropriate destination server.

According to an embodiment of the present invention, web-services 126 (see FIG. 3) may be used to provide Internet-friendly communications. For example, an HTTP server 120 (see FIG. 1) loaded on user interface 33 (see FIG. 1) may be utilized to provide a mechanism for remote service invocation on a second computer, typically located behind a firewall. Remote service invocation allows an application on one device to make use of the functionality provided by a component on another device.

There are a number of middleware alternatives that exist today that provide a remote service invocation mechanism. The most prominent of these are the remote procedure call in the Microsoft DCOM architecture and CORBA, as well as Remote Method Invocation in Java. As persons skilled in the IT industry will understand, CORBA uses the IIOP (Internet Inter-ORB Protocol) wire protocol for remote method invocation, Java uses JRMP (Java Remote Method Invocation Protocol), and DCOM uses its own proprietary wire protocol for the same purpose. Unfortunately, none of these protocols are directly interoperable with each other. In addition, these protocols are typically not allowed through firewalls in most IT organizations. As a result, it may not be desirable to utilize these protocols to web-enable Ethernet-based BAS devices, such as the sensors and actuators illustrated in FIG. 1.

Figure 3:
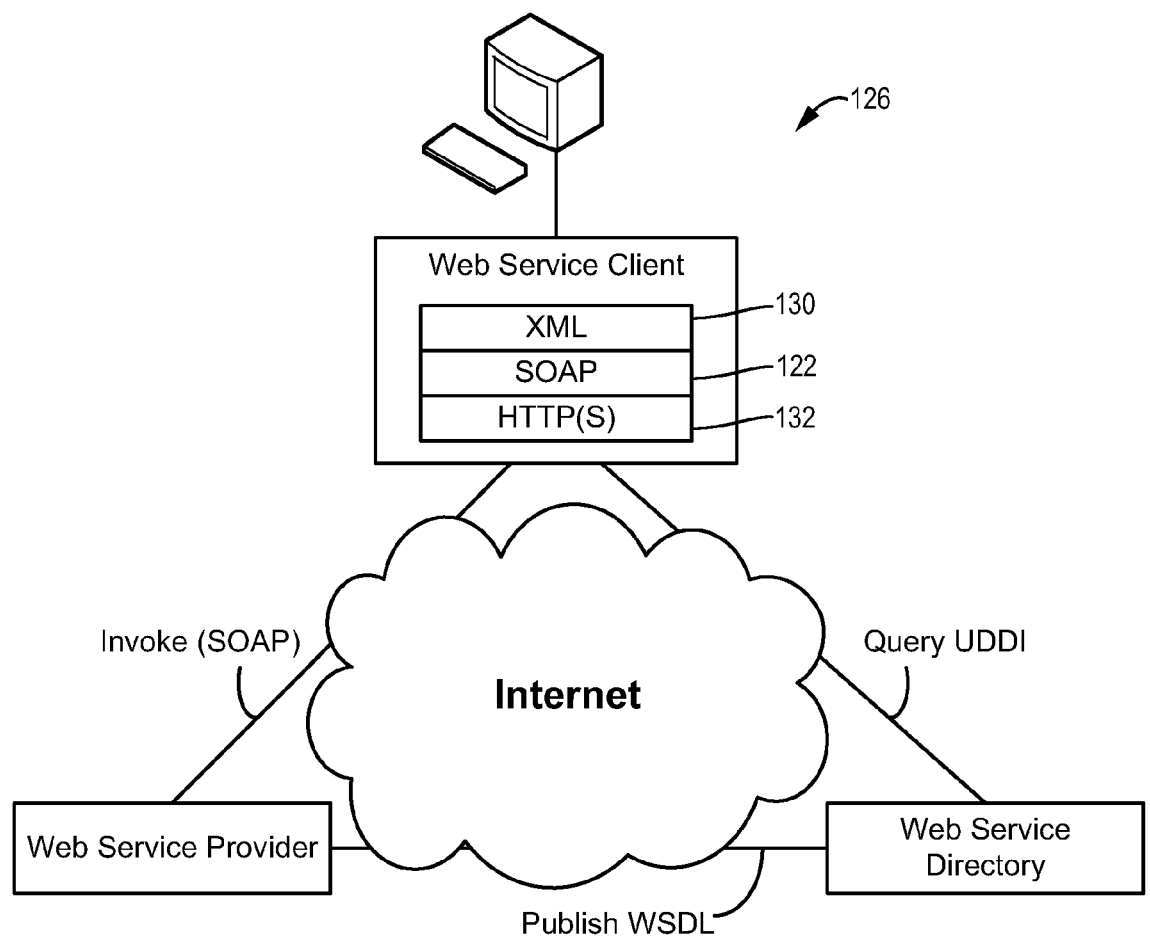
FIG. 3 is a block diagram of a web services application according to an exemplary embodiment.

In order to circumvent the interoperability issues and allow remote procedure invocations to pass through firewalls, BAS device architecture 100 preferably includes a SOAP (Simple Object Access Protocol) element 122 (see FIGS. 2 and 3). As is well known in the IT industry, SOAP defines a standard syntax for expressing the information required to make remote service invocations, including the location of the service provider, service or method to be invoked, parameters to be passed in, and return parameter information. As explained below, SOAP is based on XML (Extensible Markup Language), which is a text-based language. SOAP defines the required format of an XML document containing the remote invocation information. SOAP has the following advantages:

it is interoperable it has been embraced by Microsoft (through their .NET initiative), Sun (via JavaOne), IBM, and other major players in the industry it is intended to operate across all operating systems and hardware platforms.

it loosely couples applications together (only the XML syntax need be agreed on between the applications).

it allows remote service invocation to cross through firewalls using HTTP as a transport.

SOAP element 122 allows a wide variety of web services to be implemented on the various BAS devices of BAS 10. Each set of web services exposes a number of methods or procedures that allow remote applications to monitor data and perform control over an intranet or the Internet. It should be noted that other types of web services besides, or in addition to, SOAP could be used in BAS 10 depending on the particular circumstances of a situation. Some examples of web services that may be used in the operation of BAS 10 will now be discussed.

First, an offline controller configuration may be utilized according to an embodiment of the present invention. An offline controller configuration is the process of defining a controller configuration database within an application on a configuration server and later submitting that configuration to the controller for downloading and processing. For this purpose, BAS device architecture 100 preferably includes a control engine 128 (described in detail below) that supports the ability to download the configuration database from a configuration server running a copy of the offline configuration application. Download can be done on the intranet or over the Internet (e.g., via a web service). Within the download web service in control engine 128, the XML files are parsed and turned into control engine "add" or "modify" application programming interface (API) requests or appropriate service requests to the other service components or applications.

Control engine 128 is the primary monitoring and control component of the associated Ethernet-based BAS device. It houses most of the BAS functionality that is traditionally expected from a "supervisory level" BAS controller. This can include applications that coordinate activities across a network of field devices (e.g., Interlocking or DLLR) or perform control of equipment. As such, it includes control functions that have traditionally been housed in field bus devices. It is also the mechanism whereby the controller is able to communicate with field bus devices, BACnet devices and other legacy and third party devices.

The same set of web services 126 (see FIG. 3) can also be used to archive (serialize) and restore the controller database to a disk on a configuration server. The archival process consists of serializing the control engine and service component data to an XML file 130 that is then uploaded to the configuration application in the configuration server. The database restore process is similar, however, it is conducted in the opposite direction.

Another web service that may be utilized in BAS device architecture 100 is a SOAP client proxy component 124. While web services 126 provide the code for execution of services within the controller, a SOAP proxy component 124 provides local clients with the capability to build and make those requests to another device. That is, SOAP proxy component 124 contains the functionality that packages the remote service invocation into a valid SOAP/XML document. It further packages that XML document into an HTTP 132 request that is then sent to HTTP server 120 on the remote device for invocation.

In addition to the foregoing, BAS device architecture 100 may also incorporate standard IT-based security mechanisms to protect the software loaded on the associated BAS device. To accomplish this, the BAS device can incorporate the current IT standards and technologies commonly used in web server architectures. This enables communications through standard IT infrastructures without placing additional requirements on the infrastructure that may jeopardize network security. It also provides the mechanisms for standard web interoperability of BAS devices. Further, secure access to BAS data may be accomplished by providing security via a high performance password access mechanism, thereby enabling consistent and controlled access to BAS data, files and applications.

It is important to note that the above-described preferred embodiments are illustrative only. Although the invention has been described in conjunction with specific embodiments thereof, those skilled in the art will appreciate that numerous modifications are possible without materially departing from the novel teachings and advantages of the subject matter described herein. For example, although the invention is illustrated using particular standards-based IT technologies over an IT network to manage BAS devices, any number of other standards-based IT technologies may be used. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present invention.

What is claimed is:

1. A device for integrating a field-level building automation system device and/or a configurable field controller with an internet protocol (IP)-compatible communications network in a building, the device comprising:
    a control engine interface included on the device for directly communicating with the field-level building automation system device and/or the configurable field controller via a field bus;
    a control engine operatively coupled to the control engine interface, the control engine configured to monitor and control the field-level building automation system device and/or the configurable field controller via the field bus;
a communications device for communicating on the IP-compatible communications network in the building;
    a web service for receiving a web service request from an application running on another device connected to the IP-compatible communications network in the building, the request received via the communications device, the web service configured to communicate with the control engine to respond to the received request, wherein the web service provides for remote service invocation of a function of the control engine;
    a component configured to provide clients of the device and/or the application running on the another device with information for making a remote service invocation to one or more other devices on the IP-compatible communications network, wherein the component is further configured to package the remote service invocation into a message for parsing by the one or more other device, the component configured to provide the message to the communications device for transmission to the one or more other devices.

2. The device of claim 1, further comprising:
    a second web service configured to download a configuration database comprising at least one extensible markup language (XML) file from a configuration server, wherein the second web service is further configured to parse the at least one XML file to conduct configuration of the control engine.

3. The device of claim 1, wherein the web service is configured to respond to the received request by generating an XML document and sending the XML document over the IP-compatible communications network.

4. The device of claim 1, further comprising a dynamic host configuration protocol (DHCP) element configured to automatically obtain an IP address and at least one additional network parameter from a DHCP server.

5. The device of claim 1, further comprising a hypertext transfer protocol (HTTP) server configured to receive the request and to forward the request to the first web service.

6. The device of claim 1, wherein the control engine is primary monitoring and control components of the field level building automation system device and/or the configurable field controller.

7. The device of claim 1, wherein the control engine further comprises an application that coordinates activities across the field bus.

8. The device of claim 1, wherein the control engine is the supervisory level controller of the field-level building automation system device and/or the configurable field controller.

9. The device of claim 1, further comprising:
    a clock; and
    a simple network time protocol (SNTP) element configured to synchronize the clock with an external time source on a regular basis.

10. The device of claim 1, further comprising a simple network management protocol (SNMP) element configured to communicate operational statistics with an external network manager.

11. The device of claim 10, wherein the SNMP element is configured to send building automation system alarms to the external network manager.

12. The device of claim 1, further comprising an e-mail alarm component and a simple mail transfer protocol (SMTP) element, the e-mail alarm component configured to reformat an alarm received via the control engine interface for e-mail and to utilize the services of the SMTP element to send the e-mail via the communications device.

13. The device of claim 1, wherein the web service is configured to archive information to an external source by generating an extensible markup language (XML) file and sending the file to the external source over the IP-compatible communications network.

14. The device of claim 1, wherein the web service is configured to respond to the received request by generating an XML document and sending the XML document over the IP-compatible communications network.

* * * * *